US006734232B2

(12) United States Patent
Hagiopol

(10) Patent No.: US 6,734,232 B2
(45) Date of Patent: May 11, 2004

(54) STYRENE-ACRYLATE COPOLYMER COMPOSITION SUITABLE FOR SURFACE SIZE

(75) Inventor: Cornel Hagiopol, Lilburn, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 43 days.

(21) Appl. No.: 10/097,656

(22) Filed: Mar. 15, 2002

(65) Prior Publication Data

US 2003/0176556 A1 Sep. 18, 2003

(51) Int. Cl.[7] .......................... C08K 7/16; C08L 29/04

(52) U.S. Cl. .......................... 524/35; 524/47; 524/502; 524/503; 524/515; 523/223

(58) Field of Search .......................... 523/223; 524/35, 524/47, 502, 503, 515

(56) References Cited

U.S. PATENT DOCUMENTS 3,941,736 A 3/1976 Aldrich
4,109,053 A 8/1978 Aldrich
4,112,155 A 9/1978 Carel et al.
4,115,331 A 9/1978 Tominaga et al.
4,199,490 A * 4/1980 Kamiya et al.
4,855,343 A 8/1989 Degen et al.
4,931,510 A 6/1990 Sackmann et al.
5,004,767 A 4/1991 Krause et al.
5,118,533 A 6/1992 Saji et al.
5,139,614 A 8/1992 DePierne et al.
5,147,907 A 9/1992 Rinck et al.
5,258,466 A 11/1993 Sackmann et al.
5,290,849 A 3/1994 Lee
5,358,998 A 10/1994 Wendel et al.
5,416,181 A 5/1995 Nguyen et al.
5,525,661 A 6/1996 Lee
5,565,509 A 10/1996 Nguyen et al.
5,591,489 A 1/1997 Dragner et al.
5,679,735 A 10/1997 Geissler et al.
5,795,932 A 8/1998 Dragner et al.
5,824,190 A 10/1998 Guerro et al.
6,020,061 A 2/2000 Hurley et al.
6,034,181 A 3/2000 Bazaj et al.
6,051,107 A 4/2000 Varnell
6,114,417 A 9/2000 O'Toole et al.
6,130,288 A 10/2000 Inoue et al.
6,171,444 B1 1/2001 Nigam

OTHER PUBLICATIONS

New Paper Sizing Composition, Citations from CA Search (84–89) CA4. Apr. 18, 2001.

Abstract Only. Surface–processing agent for paper polystyrene–polyacrylate copolymer, glyoxal and water–soluble polymer polyacrylamide. JP 61207697 A, Sep. 16, 1986.

C. Lee et al., Synthesis and physical properties of the crosslinking poly(butyl acrylate)/polystyrene core–shell composite latex. 2000. pp. 629–636, vol. 32, Polymer Journal.

* cited by examiner

*Primary Examiner*—Kriellion A. Sanders
(74) *Attorney, Agent, or Firm*—Banner & Witcoff, Ltd.

(57) ABSTRACT

A composition of matter for surface sizing of paper and other cellulosic products. In particular, the composition is a styrene/acrylic acid ester copolymer latex made by emulsion copolymerization without surfactants.

21 Claims, No Drawings

STYRENE-ACRYLATE COPOLYMER COMPOSITION SUITABLE FOR SURFACE SIZE

FIELD OF THE INVENTION

The invention relates to a surface size for cellulosic products. In particular, the invention relates to a styrene/acrylate copolymer latex made by emulsion copolymerization conducted without a surfactant.

DESCRIPTION OF RELATED ART

Paper and other cellulosic products often are sized, i.e., are treated by deposition of a composition to ameliorate characteristics related to the porosity and the hydrophobicity of the cellulosic product. Sizing typically is used to control absorption by the substrate of water, water-borne compositions, and inks.

Internal sizing or surface sizing typically sizes cellulosic products. Internal sizing involves mixing sizing agent with pulp and forming a sheet, or web, having uniform distribution of sizing agent and pulp throughout. Surface sizing involves application of the sizing agent to the surface of a previously formed web. Surface sizing typically increases the hydrophobic character, improves product quality and is less expensive than internal sizing because almost the entire sizing agent is retained on the surface of the treated product.

However, surface sizing is not without difficulty. Sizing agent is applied under high pressure to ensure even distribution over the treated product, and there is continual effort to increase production speed. Thus, the ability to distribute sizing agent evenly over the web becomes more important. Sizing agents are subjected not only to mechanical stress during application, but also to potential chemical interactions with chemicals present in and on the cellulosic product to be sized. Many of these chemicals may cause undesirable precipitation of components from the sizing.

Divers natural and synthetic resins have been used as surface sizing agents. Typical of such known sizing agents are modified rosin, modified petroleum resins, and synthetic copolymers, such as copolymers of an ethylenically unsaturated monomer with an acrylate, alkyl ketene dimer, and the like.

The surface-sizing agent should be dissolved or dispersed in water. For dispersions, various compositions, including synthetic polymeric products, are known for use as a stabilizer. For example, use of a copolymer comprising styrene or a similar hydrophobic monomer and (meth)acrylic acid or a low molecular weight (500–50,000) copolymer of an $\alpha$-olefin and maleic anhydride as an emulsifier is known.

Known synthetic resin dispersions may have broad particle size distributions, and often are made in the presence of surfactant, also known as emulsifiers or soaps. A broad particle size distribution may reduce the effectiveness of the compound as a sizing agent by making it more difficult to ensure even distribution of the sizing agent on the web, and may yield inconsistent surface properties and characteristics. Some synthetic resins are made by emulsion polymerization in the presence of surfactants. The presence of surfactant may interfere with the performance of the material as a sizing agent.

The performance of these known compounds as sizing agents is not entirely satisfactory. Manufacturing techniques typically are complex, often require an emulsifier that may interfere in the performance of the sizing agent, and the resulting product may not have a suitable particle size and particle size distribution. Known sizing agents also may not be stable at low pH values. However, stability at low pH value is important for sizing agents to be used in the manufacture of security papers and other cellulosic products comprising material such as manganese sulphate or polyguanidine, for example. Thus, there exists a need for surface sizing agent that is easily manufactured without surfactants and has a suitable particle size and particle size distribution. There also exists a need for a surface sizing agent that is stable at low pH and is compatible with components found on security paper products.

SUMMARY OF THE INVENTION

The invention is directed to a composition of matter for surface sizing of paper and other cellulosic products. In particular, the composition is styrene/acrylic acid ester copolymer latex made by emulsion copolymerization without surfactants.

DETAILED DESCRIPTION OF THE INVENTION

The invention is directed to composition of matter for surface sizing paper and other cellulosic products. The composition is a styrene/acrylic acid ester copolymer latex made by emulsion copolymerization without surfactants. In one embodiment, the latex is stable at pH values between about 1.5 and about 10. Therefore, the composition is compatible with, inter alia, manganese sulphate ($MnSO_4$), a stain commonly used in security paper, and polyguanidine, also used in security paper. In another embodiment, the styrene/acrylic acid ester co-polymer is made in the presence of a solubilized styrene/maleic acid copolymer. Both the styrene/acrylic acid ester copolymer discontinuous phase and the styrene/maleic acid copolymer are suitable sizing agents.

The composition of the invention is manufactured by polymerizing styrene and an acrylic acid ester in the presence of water-soluble compounds, but without surfactant. The water-soluble compounds may have either high or low molecular weights. Low molecular weight water-soluble compounds are able to copolymerize with the styrene and acrylic acid ester or to transfer the free radical species during polymerization. The emulsion polymerization is initiated with a persulfate salt, with a hydroperoxide, whether alone or in a redox system with sodium erithorbate or dimethylaminoproprionitrile, or with an azo-derivative, at a temperature between about 25 and about 90° C.

In one embodiment, two different water-soluble co-monomers are present in the continuous phase of the emulsion. A first water-soluble co-monomer is selected from the group consisting of monomers having an allylic moiety. Preferred monomers having an allylic moiety suitable for use as a first water-soluble co-monomer in accordance with the invention are selected from the group consisting of sodium 1-allyloxy-2-hydroxypropyl sulfonate, allyl acetate, allyl glycidyl ether, allyl lactate, and blends thereof. Sodium 1-allyloxy-2-hydroxypropyl sulfonate is commercially available under the trade name SIPOMER COPS I, available in approximately 40% aqueous solution from Rhodia, Inc. A second water-soluble co-monomer is selected from the group consisting of maleic anhydride, maleic acid, fumaric acid, abietic acid; abietic acid-fumaric acid adduct, itaconic acid; the ammonium, sodium, and potassium salts thereof; and blends thereof. Suitable abietic acid-fumaric acid adducts include NovaFlo® 50 (50% concentration of potassium salt of abietic acid fumaric acid adduct in water) and NovaFlo® 072G43, both available from Georgia-Pacific. None of the water-soluble co-monomers is capable of homopolymerization, and none of the co-monomers is capable of polymerizing with another member of the same co-monomer group, but members of the first co-monomer group can co-polymerize with members of the second co-monomer group and with both styrene and acrylic acid esters. Selective incorporation of the water-soluble co-monomer into the styrene/acrylic acid ester co-polymer can be used to alter the properties and characteristics of the co-polymer. Changing the ratio between water-insoluble co-monomers (styrene, acrylic acid ester) and water-soluble co-monomers changes the hydrophilic/hydrophobic balance of the resultant polymer. A stabilizer is generated in situ and will enhance latex stability. Water-soluble co-monomer is present in a combined amount of between about 0.1 and about 10 weight % of the combined weight of the styrene and acrylic acid ester monomers used in making the styrene/acrylic acid ester polymer. Amounts less than about 0.1 weight % tend to reduce the latex stability. Amounts greater than about 10 weight % may adversely affect the sizing properties.

The latex product of the invention is stable at pH between about 1.5 and 10, in the absence of the solubilized styrene/maleic acid polymer. This stability at low pH affords the opportunity to use the size in the presence of manganese sulphate and polyguanidine, components often used in the manufacture of tamper-resistant papers.

In another embodiment, a solublized styrene/maleic acid (also referred to as "SMA") copolymer is present in the dispersed phase of the emulsion as a water-soluble compound. The styrene/maleic acid copolymer comprises 50–80 weight % styrene and 50–20 weight % maleic acid and has a molecular weight of between about 10,000 and about 200,000. Lower molecular weight may not ensure latex stability, and higher molecular weight will increase the latex viscosity. The copolymer is solubilized by forming the ammonium salt thereof in any manner known to the skilled practitioner. Such a copolymer is commercially available from the Georgia-Pacific Resin Company under the trade name NovaCote® 1936.

Solubilized styrene/maleic acid copolymer is present in an amount sufficient to provide a weight ratio of styrene/maleic acid copolymer to styrene and acrylic acid ester used in making the styrene/acrylic acid ester polymer of between about 0.1:1 to about 10:1. Thus, the continuous phase components and dispersed phase components are supplied in quantities and proportion to obtain the desired weight ratio while affording sufficient continuous phase sufficient to maintain a desired concentration and quantity of components. For example, the skilled practitioner recognizes that the quantity of water present in the product latex is limited, inter alia, by the desired solids content of the product latex and the solubility of the components. Thus, the temperature and the quantity of water present are, in part, determined by the solubility of the components, as set forth below.

Water-soluble co-monomer able to co-polymerize or to transfer free radical species optionally also may be present in the dispersed phase in this embodiment, together with the solublized styrene/maleic acid co-polymer. If present, water-soluble co-monomer is present in total quantity sufficient to provide between about 0.1 and about 10 weight %, based on the combined weight of the styrene and acrylic acid ester monomers used in making the styrene/acrylic acid ester polymer.

Water-soluble co-monomer is selected from group consisting of monomers having an allylic moiety as defined above, maleic acid, maleic anhydride, fumaric acid, itaconic acid, abietic acid, abietic acid-fumaric acid adduct; the ammonium, sodium, and potassium salts of these acids; and blends thereof. In this embodiment, any one or a combination of these co-monomers optionally may be used.

In accordance with the invention, water-soluble co-monomers present during polymerization may co-polymerize with the styrene/acrylic acid ester and modify the properties and characteristics of the dispersed phase, as described above. Further, one can influence both particle size and particle size distribution of the dispersed phase by modifying the weight ratio between the continuous phase co-polymer and the polymers used to produce the dispersed phase. Both the water soluble macromolecular compound, i.e., the stabilizer produced in situ or styrene/maleic acid copolymer and its salts, and the styrene-acrylic acid ester copolymer provide a synergistic effect as sizing agents.

Supplemental high molecular weight non-ionic stabilizer selected from the group consisting of polyvinyl alcohol, starch, hydroxyethyl cellulose, and blends thereof, may be present in an amount of up to about 25 weight %, based on the combined weight of the styrene and the acrylic acid ester monomers. The polyvinyl alcohol preferably is partially hydrolyzed (87–89%) and has a viscosity of about 3 to about 8 cPs in 4% aqueous solution at about 20° C. One such suitable product is available in powder form under the trade name AIRVOL-203, from Celanese Ltd. A solution of this product is formed in accordance with a well-known procedure (dissolution in 95° C. DIW in about 30 minutes). The starch preferably is a low molecular weight neutral starch. Skilled practitioners can easily select suitable stabilizers with the guidance provided herein.

The resultant latex product of the invention has a solids concentration of between about 15 and about 50 weight %, and a particle size between about 0.01 and about 2.0 microns (between about 10 and about 2000 nanometers), based on the relative concentrations of components. The particle size distribution is uni-modal and narrow, having a standard deviation between about 0.005 micron and about 0.200 micron, depending on the mean diameter. As described above, both particle size and particle size distribution are functions of the relative concentrations of styrene, acrylic acid ester, and water-soluble co-monomers and solublized styrene/maleic acid copolymer.

Skilled practitioners recognize that the presence of solubilized styrene/maleic acid polymer requires higher pH, typically between about 7.5 and about 10. Styrene/maleic acid co-polymer sodium or ammonium salts having high molecular weight are good sizing agents. However, high molecular weight SMA derivatives have high viscosity, even at lower concentration (10–12%). Heretofore, higher SMA salt concentrations in water could be obtained only by imidization in a very difficult process requiring high temperature (over 130° C.) high pressure (over 30 psi), and yielding high viscosity solution (200,000 cPs, see WO 99/45039). However, this embodiment of the claimed invention provides a high concentration of sizing agent (styrene/maleic acid compounds and styrene/acrylic acid esters) having very low viscosity, and which is obtained at normal pressure without additional processing such as the imidization reaction described herein.

Although the invention has been described herein as it relates to a styrene co-monomer, other hydrophobic styrene-based monomers may be used. Examples of suitable styrene-based monomers include α-methyl styrene and alkyl-substituted styrenes, such as vinyl toluene and 4-methyl styrene. Styrene is preferred in the composition of the invention.

The acrylic acid ester component of the co-polymer is a water-insoluble ethylenically unsaturated ester of (meth) acrylic acid with a $C_1$ to $C_{18}$ alcohol. For convenience, the term "(meth)acrylic" will be used with the understanding that this term encompasses both the acrylic and the methacrylic forms. Examples of such suitable (meth)acrylic acid esters include methyl (meth)acrylate, ethyl (meth)acrylate, butyl (meth)acrylate, 2-ethyl hexyl (meth)acrylate, laurel (meth)acrylate, and stearyl (meth)acrylate. Compositions such as (meth)acrylonitrile also can be used. Preferably, butyl (meth)acrylate, and more preferably butyl acrylate, is used in preparation of the composition of the invention.

The relative proportion of styrene co-monomer to acrylic acid ester co-monomer is not critical in the sizing agent of the invention. Thus, skilled practitioners can select suitable proportions with the guidance provided herein. Typically, the acrylic acid ester is present in an amount of between about 10 and about 90 weight %, based on the combined weight of the styrene and the acrylic acid ester co-monomers used to produce the dispersed phase.

The quantity of water-soluble monomer, if present, is between about 0.1 and about 10 weight % of the combined weight of the styrene and acrylic acid ester co-monomers. Skilled practitioners recognize that the solubility of the water-soluble co-monomers is to be considered at the temperature at which the reaction is to be carried out. The reaction is carried out in the presence of a quantity of water and at a temperature sufficient to ensure adequate solubility of the water-soluble monomers and to provide a latex product having a desired solids content.

The polymerization is initiated by a persulfate salt, a hydroperoxide, whether alone or in redox system with sodium erithorbate or dimethylamino-proprionitrile, or an azo derivative, at a temperature between about 25 and about 90° C. Suitable persulfate salts include ammonium persulfate, sodium persulfate, and potassium persulfate. Suitable hydroperoxides include tert-butyl hydroperoxide and hydrogen peroxide. Suitable azo-derivatives include 2,2'-azobisisobutyl nitrile and 4,4'-azobis(4-cyanovaleric acid). Although the concentration of initiator is not critical, it typically is present in a quantity between about 0.1 and about 5.0 weight %, based on the total weight of the styrene and acrylic acid ester co-monomers used to form the dispersed phase. Preferably, initiator is present in a quantity of between about 0.5 and about 3.0 weight %, based on the total weight of styrene and acrylic acid ester co-monomers used to form the dispersed phase.

The latex emulsion of the invention is formed in accordance with the method of the invention by combining the styrene and acrylic acid ester monomers with an aqueous solution of at least one of the water-soluble co-monomers, if present, and of the solubilized styrene-maleic acid co-polymer extender, if present. Typically, the styrene and acrylic acid ester co-monomers are added to the aqueous solution. The reaction is started by addition of initiator.

The styrene and acrylic acid ester monomer can be added separately or together, and may be added in a manner that keeps the ratio of styrene monomer to acrylic acid ester monomer in the reacting mixture approximately equal to the ratio to be found in the product. In this manner, it is convenient to prepare a mixture of these two monomers, and then add the mixture to the aqueous solution.

In the alternative, these monomers can be added in a manner that yields, at one time, a latex relatively rich in styrene, and, at another time, a latex relatively rich in acrylic acid ester. This technique can be used to form styrene-acrylic acid ester polymer having a "core-shell" type construct.

The polymerization process can be carried out batch-wise or in a semi-continuous fashion. In a semi-continuous process, it is preferred to maintain the concentration of water-soluble monomer in the reaction mixture at a low and constant level to enable better particle size control. Such low, constant concentration conveniently is obtained by adding water-soluble monomer to a mixture of styrene and acrylic acid ester monomers or to a solution of initiator. With the guidance provided herein, skilled practitioners will be able to devise a suitable reaction process.

Skilled practitioners recognize that the reactor in which the latex is formed should be purged of oxygen before initiating the polymerization reaction, and that the oxygen-free atmosphere should be maintained during the polymerization. Further, a pH buffer, such as sodium bicarbonate, may be used as appropriate. Skilled practitioners can select particular buffers that will provide suitable reaction and solubility conditions yet will not interfere with the polymerization reaction.

The following examples are to be considered as exemplifying the invention, rather than limiting it in any way. For example, relative proportions of styrene and acrylic acid ester co-monomers, and of the water-soluble monomers to these co-monomers, different from those set forth in the examples are contemplated herein. Similarly, a different proportions of aqueous solution to styrene and acrylic acid ester co-monomers are contemplated, as described hereinabove.

Throughout the examples, "parts" means parts by weight.

EXAMPLE 1

A suitable stirred reactor with a condenser was purged with nitrogen, then charged with 400 parts deionized water (DIW), 50 parts AIRVOL-203 solution (10.44 wt. percent aqueous solution of polyvinyl alcohol), and 7.5 parts SIPOMER COPS I (approximately 40% solution in water having a specific gravity of 1.17 g/cm$^3$). Nitrogen purge was continued as the solution in the reactor was stirred.

A mixture of monomers and an aqueous solution were prepared separately. The monomer mixture was 80 parts purified styrene, 20 parts purified butyl acrylate, and 2 parts maleic anhydride. The initiator solution was 2 parts ammonium persulfate in 40 parts DIW.

Twenty parts of the monomer mixture were charged to the solution in the reactor and the temperature was increased to 75° C. and maintained at this temperature. The vigorousness of agitation was reduced. Then, 20 parts of the aqueous catalyst solution were added.

After 30 minutes reaction at 75° C., the remainder of the ammonium persulfate solution was added at a rate of 10 parts per hour. Also, the remainder of the monomer solution was added at a rate of 30 parts per hour. After all of the monomer solution was added (about three hours), the reactor was held at 75° C. for one hour. Then, the reactor was allowed to cool to room temperature and the characteristics and properties of the resultant latex were measured. Results are summarized in Table 1 below.

The particle size characterization was obtained by analysis using a sub-micron particle sizer (Nicomp 380) for diluted dispersion.

EXAMPLE 2

A second latex was made in accordance with the method described in Example 1. The sole difference was that the monomer mixture was made up of 50 parts styrene, 50 parts butyl acrylate, and 2 parts maleic anhydride dissolved in the water phase. The results of the determination of various properties and characteristics of the latex product are summarized in Table 1 below.

EXAMPLE 3

Another latex was developed in accordance with the method described in Example 2, except that the water phase included 400 parts DIW, 7.5 parts SIPOMER COPS I, 5 parts NovaFlo® 50 (50% concentration of potassium salt of abietic acid-fumaric acid adduct in water, available from Georgia-Pacific), and 0.2 parts of sodium hydrogen carbonate. The results of the determination of various properties and characteristics of the latex product are summarized in Table 1 below.

EXAMPLE 4

A stirred reactor with a condenser was purged with nitrogen and charged with 500 parts of 10% solution of styrene-maleic anhydride copolymer (amide-ammonium salt of styrene/maleic acid copolymer with about 26% maleic content and 80,000 molecular weight), and 2 parts abietic acid-fumaric acid adduct (NovaFlo® 072G43, available from Georgia-Pacific). Nitrogen purge was continued as the solution in the reactor was stirred.

A mixture of monomers and an aqueous solution were prepared separately. The monomer mixture was 25 parts styrene, 25 parts butyl acrylate. The initiator solution was 2 parts ammonium persulfate in 40 parts DIW. Twenty parts of the monomer mixture were charged to the solution in the reactor and the temperature was increased to 75° C. and maintained at this temperature. Then, 20 parts of the aqueous catalyst solution were added. After 30 minutes reaction at 75° C., the remainder of the ammonium persulfate solution was added at a rate of 20 parts per hour. Also, the remainder of the monomer solution was added simultaneously at a rate of 30 parts per hour. After all of the monomer solution was added (about one hour), the reactor was held at 75° C. for one hour. Then, the reactor was allowed to cool to room temperature and the characteristics and properties of the resultant latex were measured. Results are summarized in Table 1 below.

TABLE 1

| | Example 1 | Example 2 | Example 3 | Example 4 |
|---|---|---|---|---|
| Solids concentration, wt % | 18.5 | 17.7 | 21.8 | 21 |
| pH | 2.1 | 2.0 | 7.3 | 9.5 |
| Mean diameter, ($\mu$) | 0.35 | 0.17 | 0.08 | 0.025 |
| Standard deviation ($\mu$) | 0.08 | 0.03 | 0.02 | 0.006 |

The product of the invention has favorable HST values as compared with a known sizing product, as set forth in the following Table. Skilled practitioners recognize that the HST test is a well-established test protocol for performance of sized product by measuring resistance to 1% ink concentration at a reflectance of 80%.

TABLE 2

| | HST (sec) |
|---|---|
| NovaCote ® 1936 | 110 |
| Example 1 | 125 |
| Example 2 | 144 |
| Example 3 | 138 |
| Example 4 | 160 |

I claim:

1. A styrene/acrylic acid ester copolymer latex for sizing cellulosic products comprising the reaction product of hydrophobic styrene-based monomer and acrylic acid ester co-polymerized in a surfactant-free emulsion comprising hydrophobic styrene-based monomer, acrylic acid ester, and solubilized styrene/maleic acid copolymer comprising between about 50 and about 80 weight % styrene and having a molecular weight between 10,000 and about 200,000.

2. The latex of claim 1, wherein the weight ratio of styrene/maleic acid copolymer to the styrene-based and acrylic acid ester monomers is between about 0.1:1 to about 10:1.

3. The latex of claim 2, wherein the latex has a solids concentration between about 15 and about 50 wt %.

4. The latex of claim 2, wherein the particle size of the solids is between about 0.01 and about 2.0 microns and the particle size distribution is uni-modal and has a standard deviation between about 0.005 and 0.200 microns.

5. The latex of claim 1, wherein the emulsion further comprises water-soluble co-monomer selected from the group consisting of monomers having an allylic moiety selected from the group consisting of sodium-1-allyloxy-2-hydroxypropyl sulfonate, allyl acetate, allyl glycidyl ether, allyl lactate, maleic acid, maleic anhydride, fumaric acid, abietic acid, abietic acid-fumaric acid adduct, itaconic acid; the ammonium, sodium, and potassium salts thereof; and blends thereof.

6. The latex of claim 5, wherein the quantity of water-soluble co-monomer is between about 0.1 and about 10 weight %, based on the combined weight of the styrene-based and acrylic acid ester monomers.

7. The latex of claim 6, wherein the latex has a solids concentration between about 15 and about 50 wt %.

8. The latex of claim 7, wherein the particle size of the solids is between about 0.01 and about 2.0 microns and the particle size distribution is uni-modal and has a standard deviation between about 0.005 and about 0.200 microns.

9. The latex of claim 2, further comprising a macromolecular stabilizer selected from the group consisting of polyvinyl alcohol, starch, hydroxyethyl cellulose, and blends thereof.

10. The latex of claim 7 further comprising a macromolecular stabilizer selected from the group consisting of polyvinyl alcohol, starch, hydroxyethyl cellulose, and blends thereof.

11. A styrene/acrylic acid ester copolymer latex for sizing cellulosic products comprising the reaction product of hydrophobic styrene-based monomer and acrylic acid ester co-polymerized in a surfactant-free aqueous emulsion comprising hydrophobic styrene-based monomer, acrylic acid ester, a first water-soluble co-monomer having an allylic moiety, and a second water-soluble co-monomer selected from the group consisting of maleic acid, maleic anhydride, fumaric acid, abietic acid; abietic acid-fumaric acid adduct, itaconic acid; the ammonium, sodium, and potassium salts thereof; and blends thereof.

12. The latex of claim 11 wherein the first water-soluble co-monomer is selected from the group consisting of sodium 1-allyloxy-2-hydroxypropyl sulfonate, allylacetate, allyl glycidyl ether, allyl lactate, and blends thereof.

13. The latex of claim 11, wherein the total quantity of water-soluble co-monomer is between about 0.1 and about 10 weight %, based on the combined weight of the styrene-based and acrylic acid ester monomers.

14. The latex of claim 12, wherein the total quantity of water-soluble co-monomer is between about 0.1 and about 10 weight %, based on the combined weight of the styrene-based and acrylic acid ester monomers.

15. The latex of claim 13, wherein the latex has a solids concentration between about 15 and about 50 wt %.

16. The latex of claim 13, wherein the particle size of the solids is between about 0.01 and about 2.0 microns and the particle size distribution is uni-modal and has a standard deviation between about 0.005 and about 0.200 microns.

17. The latex of claim 14, wherein the latex has a solids concentration between about 15 and about 50 wt %.

18. The latex of claim 14, wherein the particle size of the solids is between about 0.01 and about 2.0 microns and the particle size distribution is uni-modal and has a standard deviation between about 0.005 and about 0.200 microns.

19. The latex of claim 17 further comprising a macromolecular stabilizer selected from the group consisting of polyvinyl alcohol, starch, hydroxyethyl cellulose, and blends thereof.

20. The latex of claim 18 wherein a macromolecular stabilizer is selected from the group consisting of polyvinyl alcohol, starch, hydroxyethyl cellulose, and blends thereof.

21. A styrene/acrylic ester copolymer latex for sizing cellulosic products comprising the reaction product of hydrophobic styrene-based monomer and acrylic acid ester co-polymerized in a surfactant free emulsion in the presence of solubilized styrene/maleic acid copolymer comprising between about 50 and about 80 weight % styrene and having a molecular weight between 10,000 and about 200,000.

* * * * *